No. 56,189.
G. DEAL.
Horse Rake.
Patented July 10, 1866.
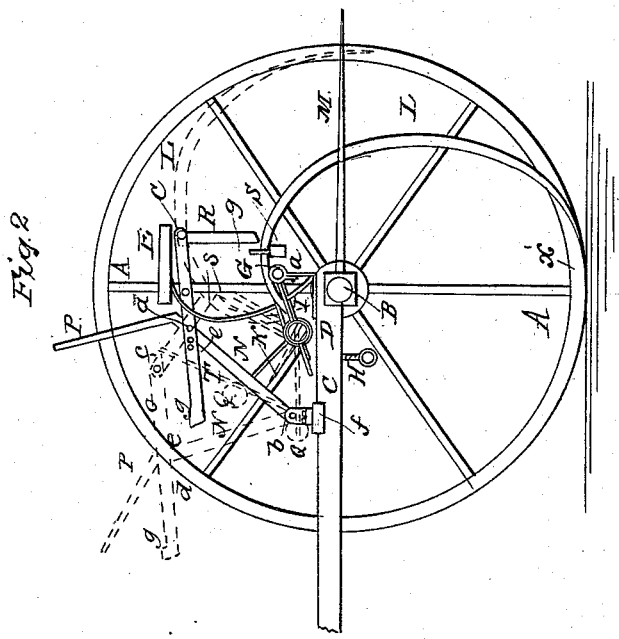
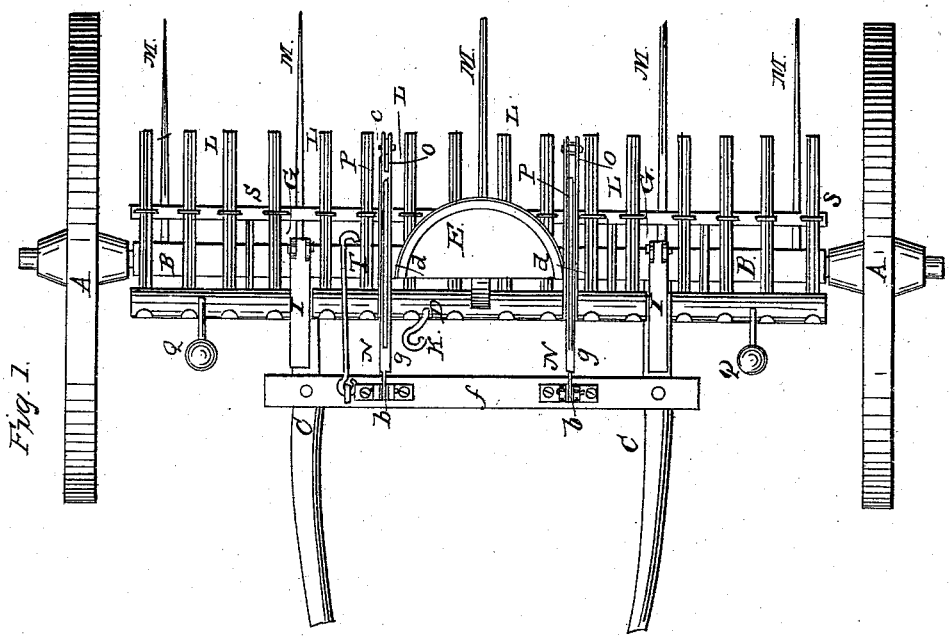
Witnesses
Inventor
Geo. Deal
By his atty
J. S. Brown

UNITED STATES PATENT OFFICE.

GEORGE DEAL, OF WAYNE TOWNSHIP, TUSCARAWAS COUNTY, OHIO.

IMPROVEMENT IN HORSE-RAKES.

Specification forming part of Letters Patent No. 56,189, dated July 10, 1866.

*To all whom it may concern:*

Be it known that I, GEORGE DEAL, of Wayne township, in the county of Tuscarawas and State of Ohio, have invented an Improved Horse-Rake; and I do hereby declare that the following is a full and exact description thereof, reference being had the accompanying drawings, making part of this specification—

Figure 1 being a plan of the rake; Fig. 2, a side view thereof, the near wheel being removed.

Like letters designate corresponding parts in both figures.

The rake is supported by two wheels, A A, and their axle B.

The first feature of my invention consists in mounting the tooth-roller D on arms I I, which are hinged at G to supports $a$ $a$ over the axle, and extend forward therefrom, as represented, so that thereby I am enabled to bring the points $x$ $x$ of the rake-teeth L L nearly or quite vertically under the axle B. This causes the points of the rake-teeth to rise and sink with the wheels as they rise over knolls and ridges or sink into depressions, thereby running as closely to the surface of uneven as of even ground without being obstructed thereby.

The forward ends of the hinged arms are adjusted up and down by set-screws H H, for the purpose of raising and lowering the teeth, as desired.

Another advantage of supporting the tooth-roller on the hinged arms lies in allowing perfect freedom to yield and permit the teeth to rise over obstructions whenever they encounter any, and at all times they give flexibility to the movements of the rake-teeth.

The rake-teeth L L are turned up around the tooth-roller D, which turns in the hinged arms I I as bearings. The teeth are all lifted together by a transverse bar, S, connected therewith by loops $s$ $s$, through which the teeth respectively extend. From this lifting-bar S standards R R project upward a short distance, and to the upper ends thereof, as at $c$ $c$, arms O O are pivoted.

Another pair or set of arms, N N, is pivoted at $b$ $b$ to a cross-bar, $f$, secured to the thills C C of the rake. The two sets N N and O O are also pivoted together at $d$ $d$, substantially as shown in the drawings, and the arms N N thence continue upward, so as to form handles or levers P P for operating or controlling the arms as the driver sits on the seat E.

Stops or stirrups $g$ $g$ on the forward ends of the rear arms, O O, (which also extend forward considerably beyond the pivots $d$ $d$,) are arranged so as to come in contact with the arms N N, when the two sets of arms are brought a little below in line with each other, and thus prevent their bending downward, while there is, of course, no tendency for them to bend upward in that position. Hence when thus situated they effectually prevent the rake-teeth from rising; but when it is desired to raise the teeth from the ground for transporting the rake the levers P P are lifted, and thus allow the arms to bend upward together, and thereby lift the teeth, as indicated by red lines in Fig. 2. There are different pivot-holes $e$ $e$ in the arms N N for receiving the pivot $d$, so as to lengthen or shorten the distance between the cross-bar $f$ and standards R R, and thus vary the height of the teeth at pleasure. When thus raised the teeth are held up by a hook, T, which is hinged to the cross-bar $f$ and hooks around one of the arms R R, as represented in Fig. 2.

A pedal or foot-lever, K, is attached to the tooth-roller to lift the teeth by the foot when desired.

Counter-weights Q Q are secured on arms projecting forward and upward from the tooth-roller D, so balancing the teeth L L as to render the said teeth light to lift.

What I claim as my invention, and desire to secure by Letters Patent, is—

The combination and arrangement of the forwardly-projecting hinged arms I I, adjusting-screws, or their equivalent, H H, tooth-roller D, and teeth L L, substantially as and for the purpose herein specified.

The above specification of my improved rake signed by me this 23d day of December, 1865.

GEORGE DEAL.

Witnesses:
WM. M. JOHNSTON,
A. H. SPRANKLE.